Aug. 25, 1936.  H. G. ANDERSON ET AL  2,052,437
CUFF LINK
Filed Jan. 25, 1936
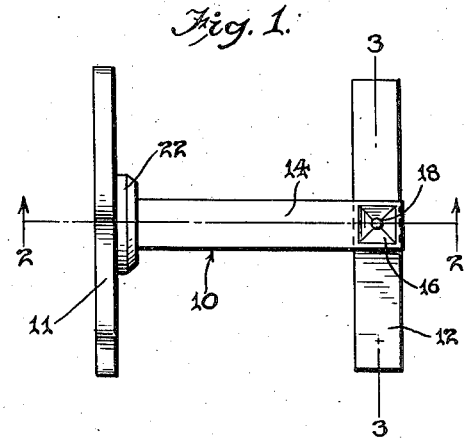
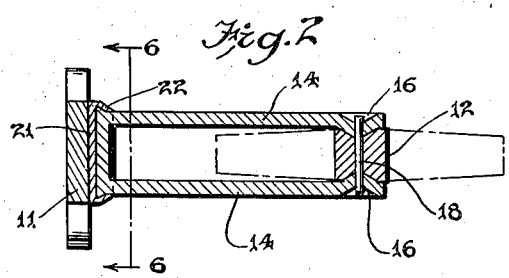
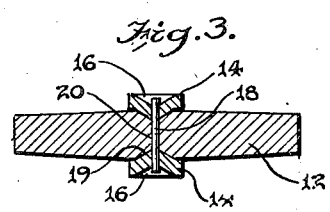
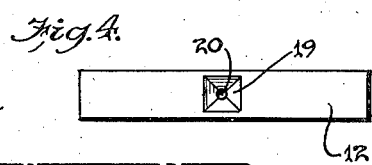
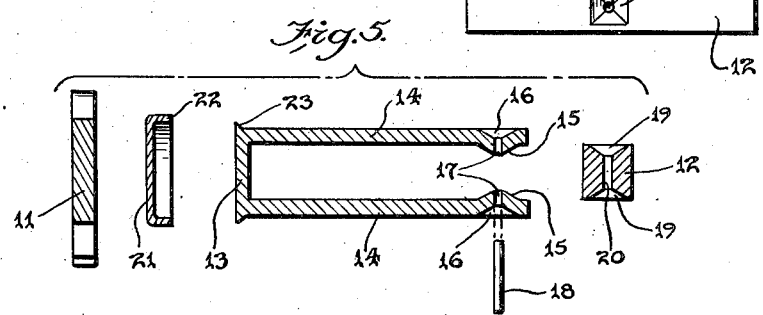
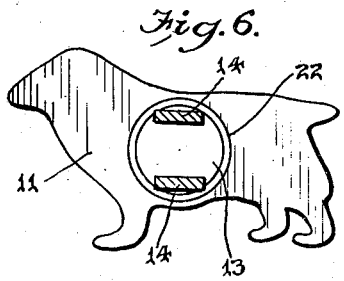
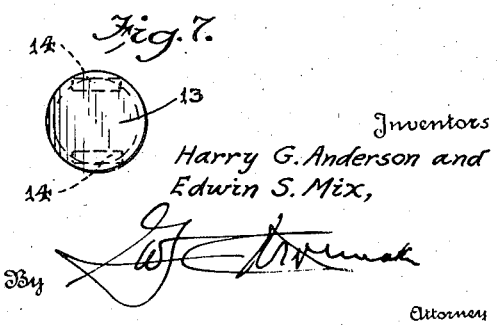
Inventors
Harry G. Anderson and
Edwin S. Mix,
By
Attorney Patented Aug. 25, 1936

2,052,437

UNITED STATES PATENT OFFICE 2,052,437

CUFF LINK

Harry G. Anderson and Edwin S. Mix, Rochester, N. Y., assignors to Hickok Manufacturing Company, Inc., Rochester, N. Y., a corporation of New York Application January 25, 1936, Serial No. 60,862

14 Claims. (Cl. 24—102)

The present invention relates generally to cuff links and more particularly to that type of cuff links in which a bar at one end of the shank is supported by means of an intermediate pivot so that it may stand in alignment with the shank in one position, as when inserting and removing the shank from cuff openings, and at right angles to the shank in the other position, as when the shank has been inserted for use as a cuff fastener.

Ordinarily such cuff links have been made up by enclosing within the cross or end bar flat springs coacting with the squared portion of a pivot pin through the bar and portions of the shank at opposite sides of the bar, to check and yieldingly hold the latter in its two positions, and the opposite end of the shank finished by an ornamental head which may be a jewel setting or a rigid cross bar.

It is one of the primary objects of the present invention to promote a more efficient means of connecting the pivoted bar with the shank and connecting the shank with an ornamental member at its end opposite to the pivoted bar, whereby from the standpoint of manufacture, the cuff links may be produced more quickly and cheaply without sacrifice as to strength, appearance or durability.

It is a further object to provide a novel type of shank and a novel type of pivoted bar capable of production as a unit assembly for attachment to an ornamental head in a manner and by means avoiding any disastrous or harmful effect upon the assembly by reason of connection of the head. By reason of such a construction, the unit assembly may be made in large quantities for stock to be attached to ornamental heads or end pieces of various characters as desired from time to time as dictated by fashion or fad.

More specifically, the present invention proposes a unit assembly in which, unlike the usual bifurcation of the shank through a milling operation, the shank is formed of a strip of metal capable of considerable elasticity, so that the side portions thereof exert sufficient spring pressure to hold coacting parts of these sides and of the bar, to support the latter and yieldingly check its movement in a right angular as well as a longitudinally aligned relationship to the shank.

In thus providing the shank depending for its effectiveness, in the unit assembly of shank and bar, upon temper and resilience of the sides thereof, a further problem arises in the subsequent connection of the ornamental head to the opposite end of the shank, and hence a further object of the invention resides in so connecting the shank and its ornamental head as to avoid injury to either, and more especially without destroying or impairing the temper and resilience of the shank sides.

With the above in mind, further objects and considerations of the present invention will be better and more readily understood by reference to the following detailed description of the best mode so far devised for carrying the invention into practice, reference being had to the accompanying drawing, which forms a part of this specification, and in which, Figure 1 is a side view of the complete cuff link.

Figure 2 is a longitudinal sectional view taken therethrough on line 2—2 of Figure 1.

Figure 3 is a transverse sectional view taken therethrough on the line 3—3 of Figure 1.

Figure 4 is a side elevation of the cross bar removed.

Figure 5 is a longitudinal section through the several parts exploded.

Figure 6 is a cross sectional view taken on line 6—6 of Figure 2, and

Figure 7 is an end view of the shank.

Referring now to these figures, the cuff link as proposed by our invention comprises a shank 10, to one end of which is attached an ornamental head 11 and to the other end of which is pivotally mounted a cross bar 12 in such manner that the latter may be either positioned in longitudinal alignment with the shank as appears in dotted lines in Figure 2, when the link is to be inserted through or removed from the openings of a cuff, or at right angles to the shank as appears in Figure 1 when the link is in use.

For the above purposes, the ornamental head 11 may be of any suitable character as, for instance, a set jewel or a cast metal head as shown in the form of a miniature animal, and it is important as far as our invention is concerned only to the extent that it permits of the attachment, in any suitable manner, to its rear face of a member presenting a rearwardly open cup having a compressible lip. From this it is obvious that the head may have cast therewith upon its rear face a ring which may be compressed for the purposes to be presently explained in detail.

The shank 10 is preferably formed in the first instance from a strip of any suitable metal having substantial elasticity or springiness, the strip of material being bent substantially in U-form to provide a circular end piece 13 at its bight potion and parallel longitudinal arms 14, the latter of which may be either straight or concavo-convex in cross section for greater strength and resistance to spreading movement of the free ends. Adjacent to the free ends, these arms are pressed or indented to form opposing bosses 15 at their inner surfaces. These bosses result in the formation of outer depressions 16 and are of pyramidal form presenting flat surfaces lengthwise of and transversely with respect to the arms 14. Through these bosses, openings 17 are also formed to loosely receive the end portions of a cross pin 18.

The cross bar 12 is confined between the indented free ends of the shank arms 14 and has intermediate its ends at diametrically opposite points recesses 19 presenting pyramidal form with flat walls corresponding to the flat surfaces of the bosses 15 which seat in the said cross bar recesses 19, as plainly seen by a comparison of Figures 2 and 3.

The cross bar 12 is also provided with an opening 20 connecting the bases of its recesses 19, and this opening is adapted to receive and hold the cross pin 18 with a driving fit, so that with the ends of this pin loosely interfitting the openings of the shank arms, the latter will have a substantial guide in their yielding movements as the cross bar is turned between a position lengthwise of the shank and at right angles thereto, in both of which positions it is substantially checked from accidental displacement by the relatively engaging flat surfaces presented by the pyramidal bosses 15 and recesses 19. Unless the head 11 be such that a ring may be formed integrally with its rear surface, an additional member 21 consisting of a circular plate having a surrounding flange 22, is secured, as by means of hard solder, to the rear face of the head 11, since it is obvious that to so connect the shank directly with the head would tend to impair, if not destroy, the desired resilience of its arms 14. For connection with this head attaching member, the plate 13 at the bight end of the shank is swaged to provide the same with a bevel edge 23, and the plate so swaged is extended into the space within the flange or ring 22, and the latter contracted or deformed around the bevel edge of the plate 13, as by means of die pressure so as to thus securely lock the bight end of the shank in connection with the head 11.

It is obvious that by thus forming the several parts as described, a strong and durable arrangement is completed, in which there is but slight wear between the moving parts, the shank and the cross bar. The cross bar will have and will retain the desired snap action in its movements between lengthwise and transverse positions, and the desired check of its movement in both of these positions against accidental displacement will be retained for an indefinite period.

Moreover, it is obvious that according to our present construction, the back or shank assembly consisting of the spring shank and its movable cross bar may be readily and easily assembled to various types of heads or stationary ornamental end pieces, depending upon style and fad, and it is to be understood that, in referring throughout to a cross bar, we use the term in the generic sense of a movable head, it being plain this member or bar may be a loop, open link or have more or less conventional form.

What is claimed is:

1. A cuff link including a shank having an ornamental head at one end and a pivoted bar at its other end, said shank having spring portions at opposite sides of the bar and said spring portions and said bar having relatively engaging means held in engaged relation by the inherent elastic pressure of the shank sides, forming the pivot of the bar and acting at the same time to yieldingly check the pivotal movement of the bar when the bar is aligned with, and at right angles to, the shank.

2. A cuff link including a shank having flexible spring side pieces, an ornamental head at one end of said shank, and a bar intermediately pivoted between the free ends of said side pieces, said side pieces and bar having relatively engaging projections and recesses held in engagement by the elastic pressure of said side pieces and forming the pivot of the bar and of a shape to yieldingly check movement of the bar when aligned with, and at right angles to, the shank.

3. In a cuff link, a unit assembly including a shank having spring side pieces, and a bar intermediately pivoted between the said side pieces, the said bar and side pieces having relatively engaging projections and recesses held in engagement by the elastic pressure of the side pieces and forming the pivot of the bar and of a shape to yieldingly check movement of the bar in certain positions thereof.

4. In a cuff link, a unit assembly including a shank having spring side pieces, and a bar intermediately pivoted between the said side pieces, said side pieces and said bar having relatively engaging pyramidal projections and recesses together forming the pivot of the bar and at the same time serving as a yielding check against movement of the bar in certain positions thereof corresponding to engagement of the flat faces of the said projections and recesses.

5. In a cuff link, a unit assembly including a shank having spring side pieces, and a bar intermediately pivoted between the said side pieces, said side pieces having inner transversely aligned projections and openings therethrough axially of said projections, and said bar having conformable recesses receiving said projections to form the pivot of said bar, said bar also having a transverse opening in line with the axes of said recesses, and a pin having a driving fit in the bar opening and having its ends extending loosely within the openings of the said side pieces.

6. A cuff link including a shank having a pivoted member at one end and an attaching portion at its opposite end, and an ornamental head at the latter end of the shank having at its rear face a seat for said attaching portion of the shank and a deformable member surrounding said seat and which, when deformed, serves to securely clamp the said attaching portion of the shank and thus firmly connect the head and shank.

7. A cuff link including a shank having spring side pieces and a flat attaching member uniting said side pieces at one end, a bar pivoted between and in connection with the side pieces at their opposite ends, and an ornamental head having a socket at its rear face receiving said attaching member and a deformable member around said socket and in secure clamping engagement with said attaching member to rigidly connect the shank and head.

8. A cuff link including a pivoted bar and shank assembly, the shank having a bevel-edged portion at one end, and a head having a space at its rear face to receive said end portion of the shank and having a ring around said space in clamping engagement with the bevel edge of said shank portion.

9. A cuff link including a shank having a transversely disposed flat attaching member at one end presenting a circular edge, and a head having a rigid ring flange at its rear face forming therein a space to receive said attaching portion and clampingly engaging the edge of the said portion to rigidly connect the shank and head.

10. A cuff link comprising a U-shaped shank having resilient bar clasping portions adjacent its free ends, a bar, means carried by the bar and the resilient clasping portions of the shank forming a pivot for the bar and a yielding check for the bar in certain positions thereof, a head, and means rigidly clamping the bight end of the shank to said head.

11. In a cuff link, a shank, an ornamental head at one end of said shank, said shank having spring side pieces at its end remote from the head, and a movable head pivoted intermediate its ends between the said free ends of the side pieces, said side pieces and said movable head having relatively engaging portions held in engaged relation by the elastic pressure of the side pieces and forming the pivot of the movable head and at the same time serving as a yielding check against movement of the movable head when aligned with, and at right angles to, the shank.

12. A cuff link consisting of a shank of U-shape having parallel resilient side extensions and an end piece connecting said extensions at one end, a bar between the free ends of said extensions, relatively engaging polygonal projections and recesses carried by said side extensions and said bar and held in place by the resilience of the side extensions to movably pivot the said bar, and a head having means for clampingly engaging the said end piece of the shank.

13. A cuff link consisting of a shank having freely extending resilient side portions, a bar between the free ends of said side portions, relatively engaging means carried by the bar and said side portions and held in engaged relation by the resilience of the side portions for pivotally supporting the bar and checking its movements in certain positions, an ornamental head, and means for securing the head to the other end of the shank without impairing the resilience of the said side portions.

14. A cuff link consisting of a shank having resilient side arms free of one another for the major portions of their lengths and at one end, a bar pivotally mounted between the free ends of said side arms, relatively engaging means carried by the bar and said side arms and held in engaged relation by the resilience of the side arms for checking movements of the bar when alined with, and at right angles to, the said arms, an ornamental head, and means for securing said head to the other end of the shank without impairing resilience of said shank arms.

HARRY G. ANDERSON.
EDWIN S. MIX.